United States Patent
Numainville et al.

(10) Patent No.: US 11,936,664 B2
(45) Date of Patent: Mar. 19, 2024

(54) IDENTITY ATTACK DETECTION AND BLOCKING

(71) Applicant: Microsoft Technology Licensing, LLC, Redmond, WA (US)

(72) Inventors: Andrew Numainville, Kent, WA (US); Rohini Goyal, Redmond, WA (US); Jingjing Zhang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 665 days.

(21) Appl. No.: 16/819,050

(22) Filed: Mar. 14, 2020

(65) Prior Publication Data

US 2021/0288981 A1    Sep. 16, 2021

(51) Int. Cl.
G06F 7/04        (2006.01)
H04L 9/40        (2022.01)
H04L 61/251      (2022.01)

(52) U.S. Cl.
CPC ........ H04L 63/1416 (2013.01); H04L 61/251 (2013.01); H04L 63/0815 (2013.01); H04L 63/083 (2013.01); H04L 63/0853 (2013.01)

(58) Field of Classification Search
CPC ........ G06F 21/31; G06F 21/316; G06F 21/45; G06F 21/46; G06F 21/55; G06F 21/62;
(Continued)

(56) References Cited

U.S. PATENT DOCUMENTS 7,444,263 B2    10/2008    White et al.
7,523,499 B2     4/2009    Wilkins et al.
(Continued)

FOREIGN PATENT DOCUMENTS

CN    108011863 A    5/2018
CN    110581827 A   12/2019

OTHER PUBLICATIONS

Grosse et al, Authentication at Scale, Dec. 13, 2012, IEEE, pp. 1-8. (Year: 2012).*
(Continued)

*Primary Examiner* — Philip J Chea
*Assistant Examiner* — Jenise E Jackson
(74) *Attorney, Agent, or Firm* — Ogilvie Law Firm

(57) ABSTRACT

Embodiments detect identity attacks by comparing usage of compromised passphrases or other weak credentials in failed sign-in attempts to access restriction conditions. A restriction threshold amount of weak credential failed sign-ins (WCFSI) or a WCFSI increase indicates an identity attack, such as a password spray attack. Going beyond the mere number of failed sign-ins by also considering credential strength allows embodiments to detect attacks sooner than other approaches. An embodiment may also initiate or impose defenses by locking accounts, blocking IP addresses, or requiring additional authentication before access to an account is allowed. Weak credentials may include short passwords, simple passwords, compromised passwords, or wrong usernames, for instance. Password strength testing may be used for attack detection in addition to preventive use on passwords proposed by authorized users. Familiar and unfamiliar traffic source locations may be tracked, as sets or individually.

20 Claims, 4 Drawing Sheets

(58) Field of Classification Search
CPC .... G06F 21/552; G06F 21/554; G06F 21/604; H04L 63/083; H04L 63/0815; H04L 63/101; H04L 63/107; H04L 63/14; H04L 63/1416; H04L 63/1425; H04L 63/10; H04L 63/1408; H04L 63/0853; H04L 61/251; H04W 12/06; H04W 12/122
See application file for complete search history.

(56) References Cited

U.S. PATENT DOCUMENTS

| | | | | |
|---|---|---|---|---|
| 8,302,187 | B1* | 10/2012 | Gupta | H04L 65/1079 726/28 |
| 8,424,061 | B2 | 4/2013 | Rosenoer | |
| 9,213,812 | B1* | 12/2015 | Windell | G06F 21/31 |
| 9,237,143 | B1 | 1/2016 | Suresh et al. | |
| 9,438,604 | B1 | 9/2016 | Addala et al. | |
| 9,942,248 | B1 | 4/2018 | Umland | |
| 2006/0021034 | A1 | 1/2006 | Cook | |
| 2008/0301175 | A1* | 12/2008 | Applebaum | G06F 16/24565 707/999.102 |
| 2008/0313721 | A1* | 12/2008 | Corella | H04L 63/10 726/6 |
| 2009/0172788 | A1* | 7/2009 | Vedula | H04L 63/1441 726/5 |
| 2010/0169957 | A1* | 7/2010 | Zurko | G06F 21/31 726/5 |
| 2011/0055913 | A1* | 3/2011 | Wong | H04L 63/102 726/5 |
| 2012/0226579 | A1* | 9/2012 | Ha | G06Q 30/02 705/26.35 |
| 2012/0266231 | A1* | 10/2012 | Spiers | H04L 9/3234 726/12 |
| 2013/0318578 | A1* | 11/2013 | Palagummi | G06F 21/554 726/6 |
| 2014/0181968 | A1 | 6/2014 | Ge et al. | |
| 2014/0237566 | A1* | 8/2014 | Enache | G06F 21/46 726/6 |
| 2015/0242603 | A1* | 8/2015 | Cross | H04L 63/083 726/7 |
| 2015/0269547 | A1* | 9/2015 | Fan | G06Q 20/306 705/26.8 |
| 2015/0350193 | A1 | 12/2015 | Torii et al. | |
| 2016/0014159 | A1* | 1/2016 | Schrecker | H04L 63/20 726/1 |
| 2016/0036838 | A1 | 2/2016 | Jain et al. | |
| 2016/0197947 | A1 | 7/2016 | Im et al. | |
| 2016/0197948 | A1 | 7/2016 | Im et al. | |
| 2016/0197962 | A1* | 7/2016 | Winn | H04L 63/0823 713/168 |
| 2016/0226853 | A1* | 8/2016 | Wall | H04L 63/1466 |
| 2016/0350528 | A1* | 12/2016 | Jakobsson | H04L 63/06 |
| 2017/0063882 | A1 | 3/2017 | Be'ery et al. | |
| 2017/0195346 | A1 | 7/2017 | Be'ery et al. | |
| 2017/0201531 | A1 | 7/2017 | Kim et al. | |
| 2017/0201542 | A1 | 7/2017 | Kim et al. | |
| 2017/0208075 | A1* | 7/2017 | Karametlian | H04L 63/205 |
| 2017/0208076 | A1 | 7/2017 | Be'ery et al. | |
| 2017/0223057 | A1* | 8/2017 | Amiri | H04L 67/306 |
| 2017/0244749 | A1 | 8/2017 | Shulman et al. | |
| 2017/0364527 | A1* | 12/2017 | Adler | G06F 16/144 |
| 2018/0007087 | A1 | 1/2018 | Grady et al. | |
| 2018/0046796 | A1* | 2/2018 | Wright | G06F 21/45 |
| 2018/0084069 | A1 | 3/2018 | Be'ery et al. | |
| 2018/0107820 | A1 | 4/2018 | Simakov et al. | |
| 2018/0205748 | A1 | 7/2018 | Gurkok et al. | |
| 2018/0218134 | A1 | 8/2018 | Be'ery et al. | |
| 2018/0248900 | A1 | 8/2018 | Keshet et al. | |
| 2018/0288063 | A1* | 10/2018 | Koottayi | H04L 67/22 |
| 2018/0302222 | A1* | 10/2018 | Agrawal | H04L 9/0637 |
| 2018/0359136 | A1 | 12/2018 | Krigsman et al. | |
| 2019/0007371 | A1 | 1/2019 | Burton et al. | |
| 2019/0253477 | A1* | 8/2019 | Nolan | H04L 47/34 |
| 2020/0112585 | A1* | 4/2020 | Keohane | H04L 9/3226 |
| 2020/0213334 | A1* | 7/2020 | Kutner | H04L 63/0263 |
| 2020/0267178 | A1 | 8/2020 | Maor et al. | |
| 2021/0152571 | A1* | 5/2021 | Varnavas | G06F 21/31 |
| 2021/0203675 | A1* | 7/2021 | Kaidi | H04L 63/1441 |
| 2021/0243207 | A1* | 8/2021 | Crume | G06F 21/552 |

OTHER PUBLICATIONS

Price et al, Protecting Privacy Credentials from Phishing and Spyware Attacks, Jun. 22, 2007, IEEE, pp. 167-174. (Year: 2007).*

"Non-Final Office Action Issued in U.S. Appl. No. 16/278,127", dated Feb. 25, 2021, 42 Pages.

Moore, et al., "4625(F): An Account Failed to Log on", Retrieved from: https://docs.microsoft.com/en-us/windows/security/threat protection/auditing/event-4625, Apr. 19, 2017, 14 Pages.

Schonning, et al., "4776(S, F): The Computer Attempted to Validate the Credentials for an Account", Retrieved from: https://docs.microsoft.com/en-us/windows/security/threat protection/auditing/event-4776, Apr. 19, 2017, 6 Pages.

"Alert (TA18-086A): Brute Force Attacks Conducted by Cyber Actors", Retrieved from: https://www.us-cert.gov/ncas/alerts/TA18-086A, Mar. 27, 2018, 3 Pages.

Simons, Alex, "Azure AD and ADFS Best Practices: Defending Against Password Spray Attacks", Retrieved from: https://www.microsoft.com/en-us/microsoft-365/blog/2018/03/05/azure-ad-and-adfs-best-practices-defending-against-password-spray-attacks/, Mar. 5, 2018, 8 Pages.

Lottner, et al., "What's New in Azure Advanced Threat Protection (Azure ATP)", Retrieved from: https://docs.microsoft.com/en-us/azure-advanced-threat-protection/atp-whats-new, Jul. 26, 2020, 28 Pages.

"Eliminate bad passwords in your organization", retrieved from <<https://docs.microsoft.com/en-us/azure/active-directory/authentication/concept-password-ban-bad>>, Jul. 11, 2018, 9 pages.

"The 773 Million Record 'Collection #1' Data Breach", retrieved from <<https://www.troyhunt.com/the-773-million-record-collection-1-data-reach/>>, Jan. 17, 2019, 16 pages.

"Intrusion detection system", retrieved from <<https://en.wikipedia.org/wiki/Intrusion_detection_system>>, Jan. 26, 2019, 13 pages.

Cameron Ero, et al., "Password spraying detection: Where do I start?", retrieved from <<https://www.okta.com/security-blog/2019/03/password-spraying-detection-where-to-start/>>, Mar. 25, 2019, 8 pages.

"International Search Report & Written Opinion Issued in PCT Application No. PCT/US21/015969", dated Apr. 15, 2021, 12 Pages.

"Notice of Allowance Issued in U.S. Appl. No. 16/278,127", dated May 17, 2021, 20 Pages.

* cited by examiner

| SOME ASPECTS 300 OF IDENTITY ATTACK DETECTION SYSTEMS 210 |
|---|
| (FAILED) SIGN-IN (310) 402 MEASURE (306)    (WRONG) USERNAME (406) 404 |
| (WEAK) PASSPHRASE (410) 408 LENGTH 412, COMPLEXITY 414, REPEAT 416 |
| LOCATION: BLOCK 418 THRESHOLD 420 / RESTRICT 314 THRESHOLD 422 |
| ACCOUNT: LOCKOUT 424 THRESHOLD 426 / RESTRICT 314 THRESHOLD 428 |
| COMPROMISED PASSPHRASE LIST 430    TARGET ACCOUNT 316 SET 432 |
| PASSPHRASE STRENGTH TESTING CODE 434    IP ADDRESS 436 |
| (UN)FAMILIAR LOCATION (440) 438    SOURCE LOCATION 318 SET 442 |

Fig. 4

| SOME EXAMPLES OF WEAK CREDENTIAL FAILED SIGN-IN (WCFSI) MEASURES 306 |
|---|
| MEASURE 504: COUNT 506 OF WEAK CREDENTIAL FAILED SIGN-INS DIRECTED TO A TARGET ACCOUNT |
| MEASURE 508: COUNT 510 OF WEAK CREDENTIAL FAILED SIGN-INS DIRECTED FROM A SOURCE LOCATION |
| MEASURE 512: COUNT 514 OF WEAK CREDENTIAL FAILED SIGN-INS DIRECTED FROM A FAMILIAR SOURCE LOCATION |
| MEASURE 516: COUNT 518 OF WEAK CREDENTIAL FAILED SIGN-INS DIRECTED FROM AN UNFAMILIAR SOURCE LOCATION |
| MEASURE 520: COUNT 522 OF WEAK CREDENTIAL FAILED SIGN-INS DIRECTED TO ANY ACCOUNT IN A SET OF TARGET ACCOUNTS |
| MEASURE 524: COUNT 526 OF WEAK CREDENTIAL FAILED SIGN-INS DIRECTED FROM ANY LOCATION IN A SET OF SOURCE LOCATIONS |
| WHERE A WEAK CREDENTIAL 308 IS A WEAK PASSPHRASE 410 OR A WRONG USERNAME 406 OR ONE OR MORE OTHER ACCESS CREDENTIALS 502 |

Fig. 5

IDENTITY ATTACK DETECTION AND BLOCKING

BACKGROUND

Attacks on computing systems take many different forms, including some forms which are difficult to predict, and forms which may vary from one situation to another. Accordingly, one of the guiding principles of cybersecurity is "defense in depth". In practice, defense in depth is often pursed by forcing attackers to encounter multiple different kinds of security mechanisms at multiple different locations around or within a computing system. No single security mechanism is able to detect every kind of cyberattack, or able to end every detected cyberattack. But sometimes combining and layering a sufficient number and variety of defenses will deter an attacker, or at least limit the scope of harm from an attack.

To implement defense in depth, cybersecurity professionals consider the different kinds of attacks that could be made. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place.

In particular, installing tools and techniques for detecting and limiting identity attacks is one of the many possibilities to consider when implementing defense in depth. Some examples of identity attacks include "password spray" attacks in which an attacker tests a given password against multiple accounts. If none of the accounts accept the first password tried, then a second password may be sprayed or stuffed, i.e., tested against multiple accounts. In a "credential stuffing" identity attack, an attacker tries to access a website B using credentials from a breached website A. In general, an identity attack continues until it is detected and shut down, or until the attacker succeeds in gaining illicit access to one or more desired accounts and moves on to the next phase of the attack, such as installing malware, exfiltrating data, or encrypting data to hold it for ransom.

SUMMARY

Some embodiments described in this document provide improved technology for detecting the likely presence of attacker activity in a monitored computer network. In particular, some embodiments detect identity attacks based on the use of compromised or otherwise weak passphrases in failed sign-in attempts. These embodiments look beyond the mere number of failed sign-ins by automatically noting what kind of passwords, usernames, and other credentials were used in the failed sign-in attempts. A relatively high percentage of weak credentials in failed sign-ins is treated as an indicator of an identity attack.

Some embodiments use or provide an attack detection hardware and software combination which is configured for automatic detection of an identity attack and for initiating an automatic defense against the identity attack. The combination includes a digital memory and a processor which is in operable communication with the memory. The processor is configured, e.g., by tailored software, to perform certain steps for detecting an identity attack in or against a monitored network. The steps include (a) determining that a credential used in a failed sign-in to a target account from a source location is a weak credential, (b) in response to the determining, updating a measure of weak credential failed sign-ins, (c) ascertaining that the updated measure satisfies an access restriction condition, and (d) in response to at least the ascertaining, initiating an access restriction on at least one of the target account and the source location. The embodiment enhances cybersecurity by detecting behavior which indicates an identity attack and by initiating an access restriction in response to the behavior, e.g., by reporting the likely presence of an identity attack or by triggering protective actions by an intrusion prevention system. Unlike attack detection approaches that count failed sign-ins indiscriminately (e.g., by lumping all failed sign-ins together), such an embodiment's detecting is based on at least both noting sign-in failure(s) and determining that a weak credential was used in the failed sign-in(s).

Some embodiments provide or use an attack detection method for enhancing cybersecurity, including: determining that a passphrase used in a failed sign-in to a target account from a source location is a weak credential; in response to the determining, updating a measure of weak credential failed sign-ins; ascertaining that the updated measure satisfies an access restriction condition; and in response to at least the ascertaining, imposing an access restriction on at least one of the target account and the source location. The method enhances cybersecurity by detecting behavior which indicates an identity attack and by imposing an access restriction in response to the behavior, e.g., by locking an account, blocking an IP address, or requiring additional authentication before access to an account is allowed. The detecting is based on at least both noting sign-in failure and determining credential weakness.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 4 is a block diagram illustrating some aspects of identity attack detection systems and methods;

FIG. 5 is a block diagram illustrating some examples of weak credential failed sign-in (WCFSI) measures;

DETAILED DESCRIPTION

Overview

Innovations may expand beyond their origins, but understanding an innovation's origins can help one more fully appreciate the innovation. In the present case, some teachings described herein were motivated by technical challenges faced by Microsoft innovators who were working to improve the usability of Microsoft cybersecurity offerings.

In particular, a technical challenge was to how to automatically and efficiently detect identity attacks against accounts in a cloud or other computer network. Even more particularly, the innovators faced the technical challenge of detecting identity attacks which take a "low and slow" approach that avoids triggering less innovative mechanisms. Such mechanisms may perform account lockout after a specified number of login failures, or they may block an IP address from which a specified number of login failures originated, or they may do both.

Some embodiments taught herein go beyond an approach which relies merely on the number of failed sign-ins to trigger account lockout or IP blocking. Instead, these embodiments automatically note the weakness or strength of passwords, usernames, and other credentials that were used in the failed sign-in attempts. When a relatively high percentage (e.g., a majority, or another specified threshold) of simple passwords, compromised passwords, wrong usernames, expired authentication tokens or certificates, or other weak credentials are being used in failed sign-ins, the embodiment initiates or even imposes defensive measures against an identity attack.

Defensive measures may include locking an account even before the published lockout level of failed sign-ins has been reached, or blocking an IP address from further communication with accounts even before an established IP blocking level of failed sign-ins has been reached, for example. Other defensive measures may require additional authentication for account access, e.g., require multifactor authentication, or notify administrators, or otherwise restrict access. Multiple defensive measures may also be initiated or imposed.

Other aspects of these embodiments, and other identity attack detection enhancement embodiments, are also described herein.

Operating Environments

Figure 1:
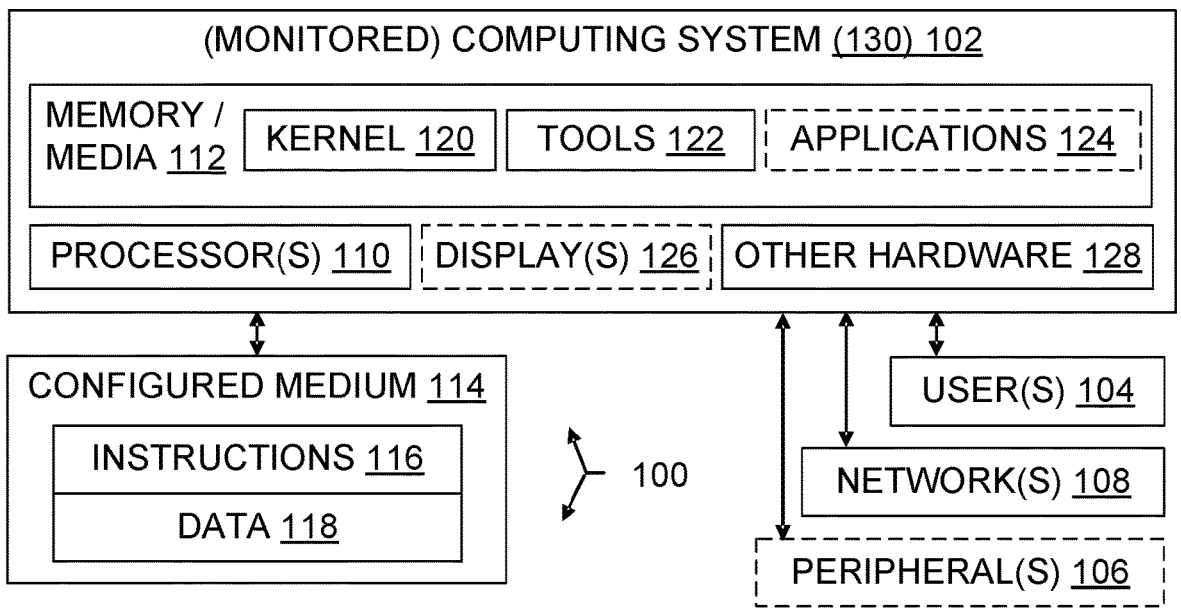
FIG. 1 is a block diagram illustrating computer systems generally and also illustrating configured storage media generally.

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, identity attack detection functionality could be installed on an air gapped network and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More about Systems

Figure 2:
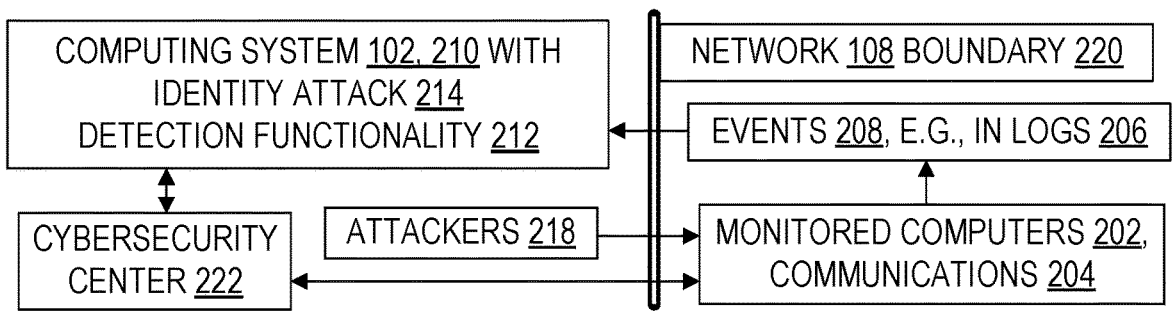
FIG. 2 is a block diagram illustrating a monitored network of computers and an identity attack detection system.

FIG. 2 illustrates an environment having a monitored network 108, 130. The monitored network includes monitored computers 102, 202 that send or receive communications 204 over network 108 connections. Monitoring produces logs 206 that describe events 208, such as login attempts, data transfers, and other network activity. "Data transfer" may refer to the act of transferring data to computer or may refer to a memorialization of that act in a log; "transfer" does not imply removal of an original, but rather is used interchangeably with "transmit" or "send a copy".

An enhanced identity attack detection system 210 receives the events and analyzes them as taught herein using identity attack detection functionality 212 such as specialized software configured to operate as taught herein, e.g., by considering failed sign-in credential strength. An identity attack detection system 210 system may go beyond merely detecting an identity attack 214, by initiating or imposing defensive measures designed to restrict access to the monitored computer(s) 202. A system 210 "initiates" a defensive measure by requesting that another system perform the defensive measure, while a system 210 "imposes" a defensive measure by itself performing the defensive measure.

Such defensive measures may be referred to expressly for emphasis, e.g., as parts or behaviors of a "detection and defense system" 210. But unless defensive measures are explicitly excluded, it is understood herein that identity attack detection systems and methods not only include functionality to detect identity attacks but also include functionality to initiate or impose defensive measures against detected attacks. Defensive measures generally are referred to herein using reference numeral 626.

An identity attack 214 may be caused or instigated by one or more attackers 218. In the illustrated environment of FIG. 2, the attackers 218 reside outside a network boundary 220 that is defined, e.g., by firewalls. But teachings herein may also be advantageously applied to detect identity attacks perpetrated by insider attackers.

Moreover, in the illustrated environment, the identity attack detection system 210 resides outside the monitored network 130, but in other environments an identity attack detection system 210 resides inside the monitored network 130. Similarly, the illustrated environment shows the identity attack detection system 210 communicating with a separately located cybersecurity center 222, but in other environments an identity attack detection system 210 resides inside the cybersecurity center 222, and in others the identity attack detection system 210 operates without any cybersecurity center 222 per se.

Figure 3:
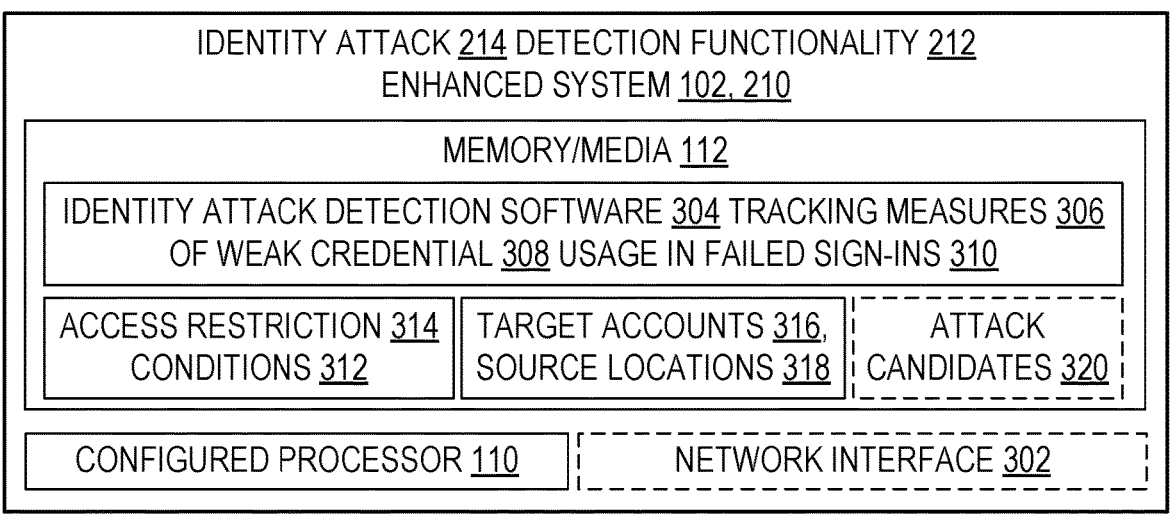
FIG. 3 is a block diagram illustrating an enhanced system configured to detect identity attacks.

FIG. 3 illustrates an enhanced system 210 which is configured to detect identity attacks and to initiate or impose defensive measures 626 against such attacks. The system 210 may be networked through an interface 302. The illustrated system 210 includes identity attack detection software 304 to perform computations that detect identity attacks by tracking specific measures 306 of weak credential 308 usage in failed sign-ins 310. For example, the identity attack detection software 304 may perform a method 600 illustrated in FIG. 6 and may track one or more of the weak credential usage measures 306 shown in FIG. 5. The software 304 may compare measure 306 values against access restriction conditions 312, and when an access restriction condition 312 is met, the software 304 may initiate or impose access restrictions 314 as defensive measures 306 against an apparent identity attack 214. An apparent attack, which is also referred to as an "attack candidate" 320, is not necessarily an actual attack but aa a precaution is treated as an actual attack. The restrictions 314 may restrict access to one or more target accounts 316, restrict access from one or more source locations 318, or do both.

For clarity, note that herein "measure" may refer to a defensive measure 626 which is an act of cyber defense, or "measure" may refer to a weak credential usage measure 306 which is a count or other statistic reflecting weak credential 308 usage in failed sign-ins 310. Context will indicate which meaning is intended.

A sign-in attempt may fail for any of a variety of reasons. In some cases, which are distinguished herein, sign-in failure is due to use of an incorrect password that is also a weak password (e.g., too short or too simple). In some, the failure is due to use of an incorrect password that is also a compromised password (compromised passwords are often short and simple, but not always). In some cases, which are also distinguished herein, sign-in failure is due to use of an incorrect username.

Sign-in failure may also be due to use of an incorrect password that is nonetheless strong, e.g., sufficiently long and complex to pass a strength test that makes it suitable in theory for use within the monitored network. This may occur, e.g., when a user mistypes the correct password, e.g., by leaving caps lock on or by transposing two characters or omitting a single character. Some accounts are configured to allow sign-ins only during certain hours, or only from certain locations, so sign-in attempts outside those hours or from other non-approved locations will fail, regardless of whether the password submitted is strong and regardless of whether the correct username is used in the attempt. Attempts to login to a locked account will also fail, even when the correct complex password and correct username are used, unless the attempt includes or follows unlocking the account. Errors in data transmission may also cause sign-in failures.

FIG. 4 illustrates various aspects 400 of at least one identity attack detection system 210. These aspects are discussed at various points herein, and additional details regarding them are provided in the discussion of a List of Reference Numerals later in this disclosure document.

FIG. 5 shows some examples of weak credential failed sign-in measures 306. These measures 306 are discussed at various points herein, and additional details regarding them are provided in the discussion of a List of Reference Numerals later in this disclosure document.

Some embodiments use or provide a functionality-enhanced system, such as system 210 or another system 102 that is enhanced as taught herein. In some embodiments, an attack detection system which is configured for automatic detection of an identity attack and for initiating an automatic defense against the identity attack includes a digital memory 112, and also includes a processor 110 in operable communication with the memory. The processor 110 is configured to perform steps for detecting an identity attack in or against a monitored network 108. The steps include (a) determining that a credential 502 used in a failed sign-in 310 to a target account 316 from a source location 318 is a weak credential 308, (b) in response to the determining, updating a measure 306 of weak credential failed sign-ins, (c) ascertaining that the updated measure 306 satisfies an access restriction condition 312, and (d) in response to at least the ascertaining, initiating an access restriction 314 on at least one of the target account and the source location, whereby the system 210 enhances cybersecurity by detecting behavior which indicates an identity attack 214 and by initiating an access restriction 341 in response to the behavior, and wherein said detecting is based on at least both noting sign-in failure 310 and determining credential weakness 308.

With regard to measure 306, an embodiment may count failed sign-ins to an account 316 without also counting failed sign-ins from an IP address 436, 318. Another embodiment may count failed sign-ins from an IP address 436, 318 without counting failed sign-ins to an account 316. Other embodiments may track both failed sign-ins from an IP address and failed sign-ins to an account.

An embodiment may use one or more different kinds of measures 306 that can indicate an attack 214, e.g., measures based on a targeted account counter, measures based on a general source location counter, measures based on a familiar source location counter, measures based on a count of failed sign-ins to a set 432 of accounts (an attack 214 may spray multiple accounts), and measures based on a count of failed sign-ins from a set 442 of locations (an attacker may rotate through multiple IP addresses 436).

In some embodiments, the measure 306 of weak credential failed sign-ins includes at least one of the following situations wherein the weak credential of interest is a weak passphrase 410: a measure 504 based on a count 506 of weak passphrase failed sign-ins directed to the target account, a measure 508 based on a count 510 of weak passphrase failed sign-ins directed from the source location, a measure 512 based on a count 514 of weak passphrase failed sign-ins directed from the source location when the source location is familiar in that the source location has been previously associated with an authorized user of the target account, a measure 516 based on a count 518 of weak passphrase failed sign-ins directed from the source location when the source location is unfamiliar in that the source location has not been previously associated with an authorized user of the target account, a measure 520 based on a count 522 of weak passphrase failed sign-ins directed to any of a predefined set of accounts that includes the target account, or a measure 524 based on a count 526 of weak passphrase failed sign-ins directed from any of a predefined set of locations that includes the source location.

As a result of distinguishing familiar locations from unfamiliar locations and giving them different respective counts an possibly also different respective restriction thresholds 422, an embodiment may block traffic from unfamiliar locations 440 (per a lower threshold 422 or higher failed sign-in count 518 or both) while still allowing traffic from familiar locations 438 (per a higher threshold 422 or lower failed sign-in count 514 or both).

In some embodiments, the measure 306 of weak credential failed sign-ins includes at least one of the following situations wherein the weak credential of interest is a wrong username 406: a measure 504 based on a count 506 of wrong username failed sign-ins directed to the target account, a measure 508 based on a count 510 of wrong username failed sign-ins directed from the source location, a measure 512 based on a count 514 of wrong username failed sign-ins directed from the source location when the source location is familiar in that the source location has been previously associated with an authorized user of the target account, a measure 516 based on a count 518 of wrong username failed sign-ins directed from the source location when the source location is unfamiliar in that the source location has not been previously associated with an authorized user of the target account, a measure 520 based on a count 522 of wrong username failed sign-ins directed to any of a predefined set of accounts that includes the target account, or a measure 524 based on a count 526 of wrong username failed sign-ins directed from any of a predefined set of locations that includes the source location.

An embodiment may leverage existing password strength testing code 434 by using it as part of identity attack detection instead of (or in addition to) using that strength testing code 434 to enforce good password hygiene when accounts 316 are created and passwords are initially set, or when users 104 change their passwords. Some embodiments include a passphrase strength testing code 434 which upon execution tests passphrase 408 strength and which is configured to test proposed passphrases 408 submitted by authorized users of accounts in the monitored network 130. In these embodiments, determining that a passphrase used in a failed sign-in to a target account from a source location is a weak passphrase 410 includes executing the passphrase strength testing code.

Some embodiments include a list 430 of compromised passphrases. In these embodiments, determining 602 that a passphrase used in a failed sign-in to a target account from a source location is a weak passphrase includes searching 704 the list of compromised passphrases.

In some embodiments, the attack detection system 210 resides 712 in the monitored network. That is, the attack detection system may be part of the network that it monitors. In some other embodiments, it straddles the network boundary 220, and in some the attack detection system 210 resides 714 outside the monitored network.

Other system embodiments are also described herein, either directly or derivable as system versions of described processes or configured media, duly informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different technical features, mechanisms, sequences, data structures, or functionalities for instance, and may otherwise depart from the examples provided herein.

Processes (a.k.a. Methods)

Figure 6:
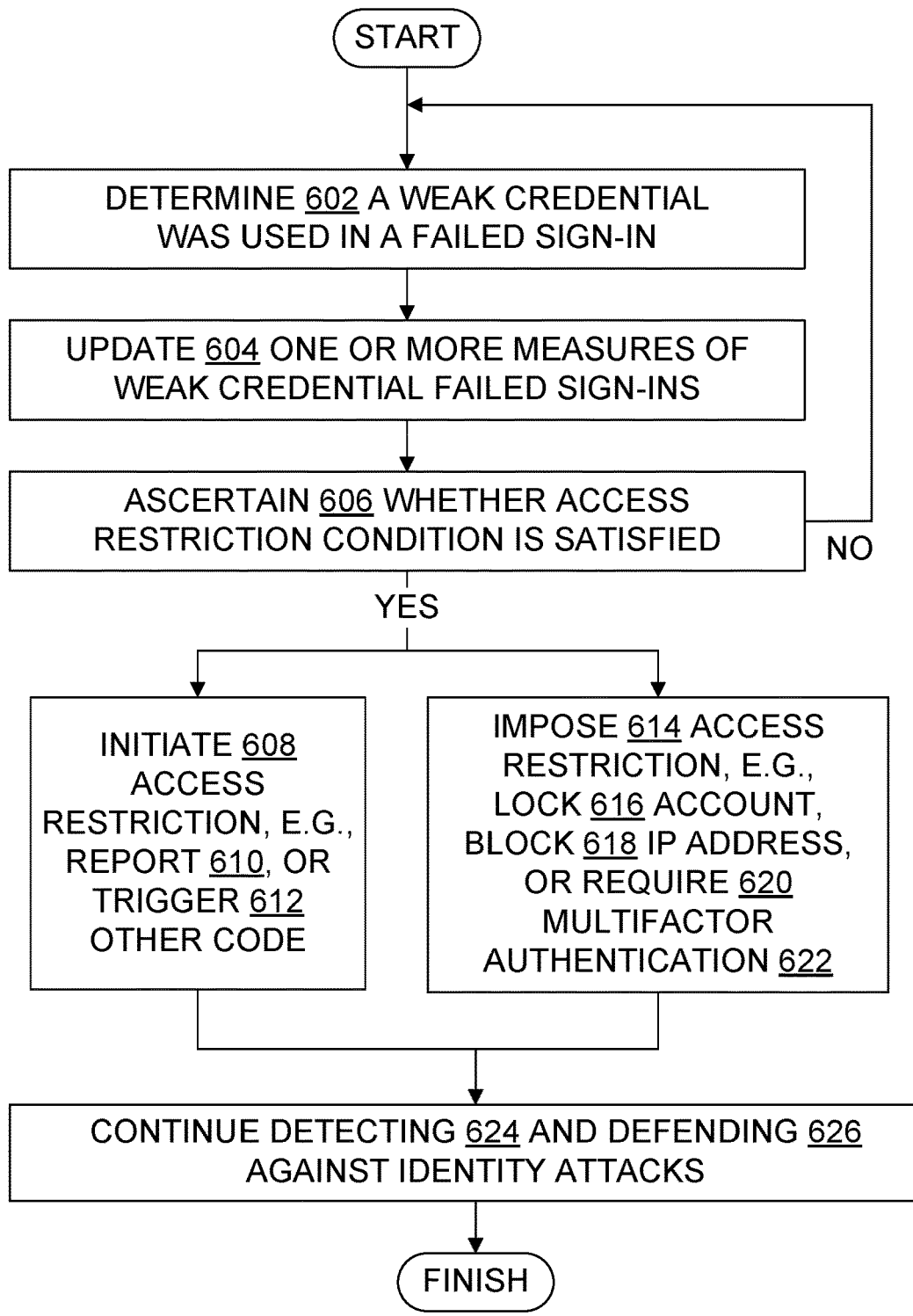
FIG. 6 is a flowchart illustrating steps in some identity attack detection and defense methods.
Figure 7:
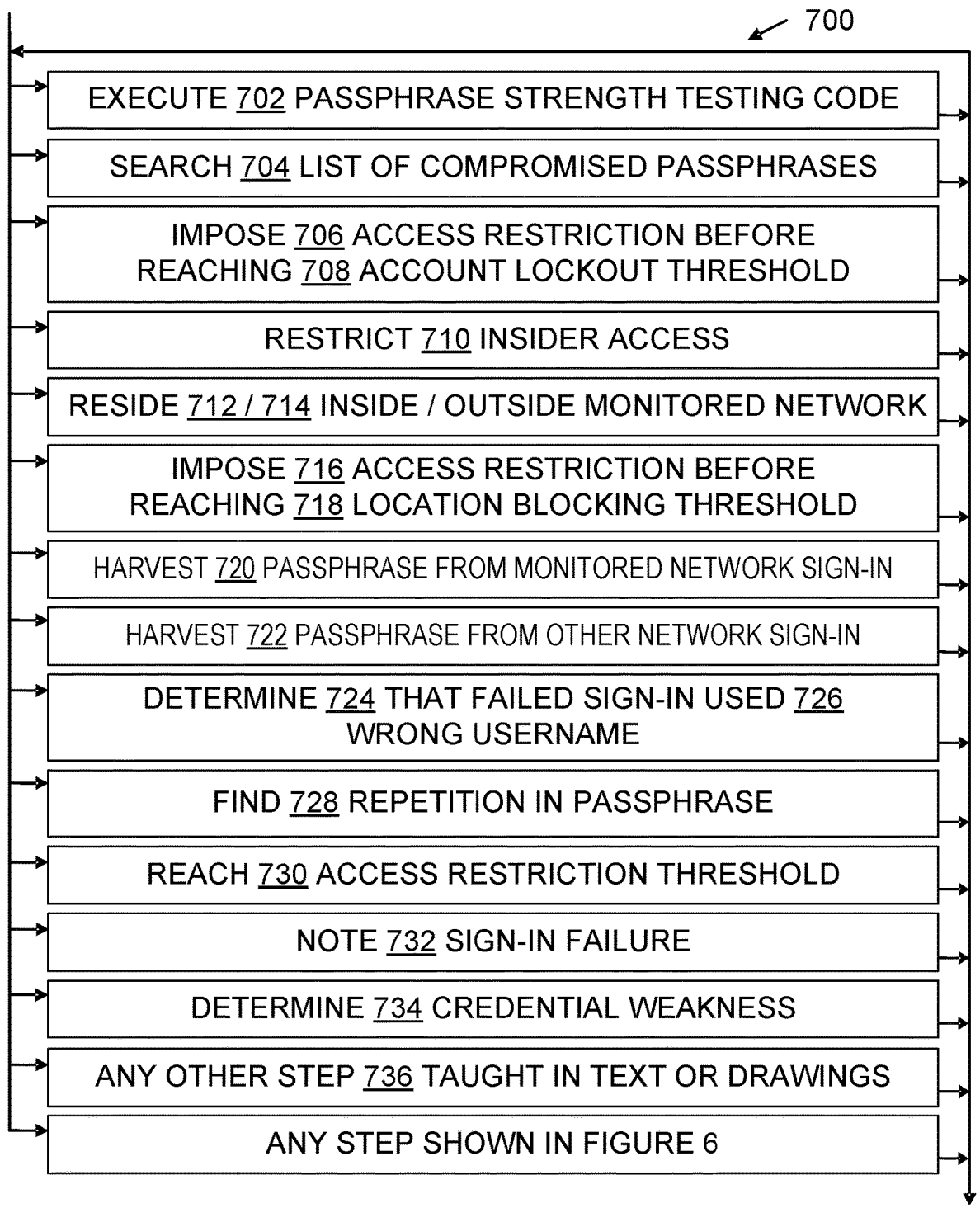
FIG. 7 is a flowchart further illustrating steps in some identity attack detection and defense detection methods.

FIG. 6 illustrates a family of methods 600 that may be performed or assisted by an enhanced system, such as system 210 or another functionality 212 enhanced system as taught herein. FIG. 7 further illustrates identity attack detection methods (which may also be referred to as "processes" in the legal sense of that word) that are suitable for use during operation of a system which has innovative functionality taught herein. FIG. 7 includes some refinements, supplements, or contextual actions for steps shown in FIG. 6. FIG. 7 also incorporates steps shown in FIG. 6.

Technical processes shown in the Figures or otherwise disclosed will be performed automatically, e.g., by an enhanced SIEM tool 122, 210, unless otherwise indicated. Processes may also be performed in part automatically and in part manually to the extent action by a human administrator or other human person is implicated, e.g., in some embodiments a human administrator may specify respective values for one or more of the restriction thresholds 422, 428. No process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 6 and 7. Steps may be performed serially, in a partially overlapping manner, or fully in parallel. In particular, the order in which flowchart 600 action items or flowchart 700 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

The present disclosure distinguishes between "initiating" an access restriction or other defense and "imposing" one. Initiating 608 includes making a request for access restriction but does not require that the access restriction actually happen, whereas imposing 614 does require that the access restriction actually happen. In particular, initiating 608 may involve alerting an administrator so that the administrator can decide whether to put the access restriction in place, whereas imposing 614 automatically puts the access restriction in place.

Some embodiments use or provide an attack detection method for enhancing cybersecurity, including the following automatic steps: determining 602 that a passphrase used in a failed sign-in to a target account from a source location is a weak credential; in response to the determining, updating 604 a measure of weak credential failed sign-ins; ascertaining 606 that the updated measure satisfies an access restriction condition; and in response to at least the ascertaining, imposing 614 an access restriction on at least one of the target account and the source location. This method enhances cybersecurity by detecting 624 behavior which indicates an identity attack 214 and by imposing 614 an access restriction in response to the behavior. Notably, the detecting 624 is based on at least both noting 732 sign-in failure and determining 734 credential weakness.

One advantage of embodiments taught herein is that they may detect identity attacks sooner than mechanisms that rely entirely on counting failed sign-ins without distinguishing between the failures based on credential weakness. For example, access to an account may be restricted before the account would have been locked under a conventional approach. In some embodiments, the method imposes 614 an access restriction 314 on access to the target account before an account lockout threshold 426 number of failed sign-ins has been directed to the target account. As another example, access to an IP address may be restricted before the IP address would have been blocked under a conventional approach. In some embodiments, the method imposes 614 an access restriction on access from the source location 318 before a source location blocking threshold 420 number of failed sign-ins has been directed from the source location.

In some embodiments, passphrase complexity 414 may be based on an extent of different kinds of characters (e.g., alphabetic, numeric, symbols, upper/lower case), character repetition, or patterns. In particular, a points-based approach such as one used by some passphrase strength testing code 434 may be employed to calculate complexity 414. Patterns can be evident as repeated weak strings or substrings such as "passwordpassword" or "20192019", or evident as keyboard patterns such as "asdf" or "1 qaz", or as repeated characters such as "aaaaaaaa" or "1111111", or as combinations thereof, for example.

In some embodiments, the credential used in a failed sign-in includes a passphrase and determining that the credential is a weak credential includes at least one of the following: testing 702 strength of the passphrase based on at least passphrase length 412, testing 702 strength of the passphrase based on at least passphrase complexity 414, or searching 704 a list 430 of compromised passphrases.

Embodiments may use or include various kinds of access restrictions 314, including for example additional authentication 622. The additional authentication 622 that is required 620 in some cases could be any kind of authentication in addition to the weak passphrase, e.g., a code texted to a phone, an approval from an administrator, a physical token, a biometric factor, or even a second and different passphrase that is associated with the target account.

In some embodiments, imposing 614 the access restriction 314 includes at least one of the following: locking 424 the target account, requiring 620 an additional authentication 622 for access to the target account, or blocking 418 an IP address at the source location.

In some embodiments, identity attack indicators include a high volume of failed sign-ins coming from an IP address with a majority of the failed sign-ins using weak passwords. This may include situations where the failed sign-ins coming from the source location are measured within a specified time period, or situations where all failed sign-ins coming from the source location are measured.

In some embodiments, identity attack indicators include a high volume of failed sign-ins towards an account with a majority of the failed sign-ins using weak passwords. This may include situations where the failed sign-ins toward the account are measured within a specified time period, or situations where all failed sign-ins toward the account are measured.

In some embodiments, a "high volume" of failed sign-ins (toward an account or from a location or both) occurs when the number of failed sign-ins crosses any value defined as a location restriction threshold 422 or any value defined as an account restriction threshold 428. In particular, in some embodiments a majority approach is used, e.g., the restriction condition 312 calls for X failed attempts using weak passwords across Y sign-ins total where X/Y>50%. In some embodiments, the larger the number of failed sign-in attempts, the more strongly the indicator signals an actual identity attack has probably been detected.

In some embodiments, ascertaining 606 that the updated 604 measure 306 satisfies an access restriction condition 312 includes ascertaining 606, 734 that a majority 422 of the failed sign-ins 310 coming from the source location 318 used 726 one or more weak passphrases 410.

In some embodiments, ascertaining 606 that the updated 604 measure 306 satisfies an access restriction condition 312 includes ascertaining 606, 734 that a majority 422 of the failed sign-ins 310 towards the target account 316 used 726 one or more weak passphrases 410.

Some embodiments track sign-in attempts using wrong (e.g., unknown) usernames 406. That is, instead of (or in addition to) tracking wrong passwords some embodiments track wrong usernames. This may be part of tracking failed sign-ins from an IP address 436. Tracking wrong usernames may track 724 usernames that don't exist in the monitored account, or that don't exist in the monitored network 130 as a whole. Tracking wrong usernames from a location 318 may provide an alternative or additional indicator of an attempted attack 214 and could be useful to help stop 418 traffic from that source location.

Some embodiments consider a passphrase weak when the passphrase is found in a list 430 of compromised passphrases. Such a list 430 may be generated anywhere from solely to substantially (i.e., from 100% to at least 40%) from attempts to login to the monitored network 130. In some embodiments, the list 430 is generated anywhere from solely to substantially from sign-in attempts to any network, e.g., a list 430 such as one that is publicly available from the haveibeenpwned website may be used, in whole or in part, possibly with entries from other compromised passphrase sources.

In some embodiments, determining 602, 734 that the credential used in a failed sign-in is a weak credential includes at least one of the following: searching 704 a list 430 of compromised passphrases in which at least three-quarters of the listed passphrases were harvested 720 from attempts to sign-in to the monitored network, or searching 704 a list 430 of compromised passphrases in which at least half of the listed passphrases were harvested 722 from attempts to sign-in to one or more networks other than the monitored network or from attempts to sign-in to an unspecified network (some sources of compromised passphrases do not specify which network 108 their entries are harvested from).

It is expected, but not required, that many if not most identity attacks 214 will come from outside the monitored network 130. But teachings herein may also be applied to defend against an insider attack. In some embodiments, imposing 614 an access restriction includes restricting 710 access attempts that come from inside the monitored network 130.

Some embodiments distinguish between the locations that are sources of failed logins according to whether they were previously associated with an owner of the account the failed login was aimed at. In particular, in some embodiments a set of familiar locations 438, 318 and a set of unfamiliar locations 440, 318 have separate counters. In some embodiments, updating 604 a measure 306 of weak passphrase failed sign-ins over time includes updating 604 a familiar location attempt count 514 of weak passphrase failed sign-ins to the target account which came from one or more familiar locations 438, and also includes updating 604 an unfamiliar location attempt count 518 of weak passphrase failed sign-ins to the target account which came from one or more unfamiliar locations 440. A location 318 is deemed familiar when the location has been previously associated with an authorized user of the target account, and otherwise the location is deemed unfamiliar.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as identity attack detection software 304, WCFSI measures 306, access restriction conditions 312, compromised passphrase lists 430, passphrase strength testing code 434, and restriction thresholds 422, 428, in the form of data 118 and instructions 116, read from a removable storage medium 114 and/or another source such as a network connection, to form a configured storage medium. The configured storage medium 112 is capable of causing a computer system 102 to perform technical process steps for identity cyberattack detection and defense, as disclosed herein. The Figures thus help illustrate configured storage media embodiments and process (a.k.a. method) embodiments, as well as system and process embodiments. In particular, any of the process steps illustrated in FIG. 6 or 7, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a computing system to perform an attack detection method for enhancing cloud cybersecurity. This method includes: determining 602 that a credential 502 used in a failed sign-in to a target account in a cloud computing environment from a source location is a weak credential 308; in response to the determining 602, updating 604 a measure 306 of weak credential failed sign-ins; ascertaining 606 that the updated measure satisfies an access restriction condition 312; and in response to at least the ascertaining 606, initiating 608 an access restriction 314 on at least one of the target account and the source location. Thus, the system enhances cybersecurity by detecting 624 behavior which indicates an identity attack and by initiating 608, 626 an access restriction in response to the behavior. The detecting 624 is based on at least both noting 732 sign-in failure and determining 734 credential weakness, unlike approaches that rely on sign-in failure counts without considering credential weakness.

In some embodiments, the credential 502 submitted during a sign-in attempt includes a username and the method includes: determining 724, 602 that the username used in a failed sign-in to a target account in a cloud computing environment from a source location is a wrong username 406; in response to the determining, updating 604 a measure of wrong username failed sign-ins. In some of these embodiments, initiating 608 or imposing 614 an access restriction is at least partially in response to the measure 306 of wrong username failed sign-ins.

In some embodiments, the credential 502 used in a sign-in attempt includes a passphrase, and determining 602 that the credential is a weak credential 308 includes finding 728 at least one of the following in the passphrase: repetition 416 of a character, or repetition 416 of a string.

In some embodiments, updating 604 the measure includes updating (e.g., incrementing) account counters 506 which track the number of failed sign-ins with weak passphrases for each of a plurality 432 of respective accounts, and updating IP address counters 510 which track the number of failed sign-ins with weak passphrases for each of a plurality 442 of IP addresses.

In some embodiments, ascertaining 606 that the updated measure satisfies an access restriction condition includes at least one of the following: ascertaining that a count of failed sign-ins directed to the target account has reached an account restriction threshold 428, when the account restriction threshold is no greater than seventy percent of an account lockout threshold 426 that is not based on any passphrase weakness determination; or ascertaining that a count of failed sign-ins directed from the source location has reached a source location restriction threshold 422, when the source location restriction threshold is no greater than sixty percent of a source location blocking threshold 420 that is not based on any passphrase weakness determination. Thus, the embodiment may detect identity attacks faster than other mechanisms that fail to consider credential strength.

Additional Examples and Observations

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some embodiments implement or otherwise use teachings herein for detecting and blocking password-centric identity attacks by identifying a series of known weak passwords in failed sign-in attempts. By way of context, password spray attacks are one of the most common forms of identity-related attacks, and the frequency of these attacks is believed to be increasing at the time of this disclosure's writing. Bad actors (attackers) choose a set of passwords they believe will be commonly used amongst a set of accounts and then attempt to sign-in. A goal is that one of these sign-in attempts will be successful and the bad actor will then have access to a user's account.

IP blocking 418 and account lockout 424 (sometimes called "smart lockout") are possible defenses against password-centric identity attacks. As to IP blocking, if there are multiple failed sign-ins coming from a single IP address 436, all sign-in attempts coming from this IP will be blocked. Blocking will take place once the IP address has hit a set threshold 420 for failed sign-in attempts. As to account lockout, if there are a set threshold number 426 of failed sign-ins for a specific account, that account will be locked.

Particular attention is directed herein to weak passwords. As part of eliminating weak passwords, a service such as a Microsoft Azure® Active Directory® (AAD) service may utilize some form of proposed password screening as a kind of password protection (marks of Microsoft Corporation). In particular, AAD Password Protection software 434 uses a points-based algorithm to assess a password (typically one proposed for use) to check whether it is weak and easily guessable. The password is checked against a list of ~3000 known weak or popular words and possible character substitutions and variations. If the user's password contains one of these ~3000 words and phrases, the password receives fewer points and likely will not pass an acceptance threshold. This password strength testing algorithm detects millions of common passwords used today and many if not all of their variations. Of course, the number of listed passwords checked may vary among different software 434 implementations, as may the points that are awarded or deducted for aspects of length or complexity, and also whether a points-based approach is implemented.

When attackers 218 perform password-centric attacks 214, they tend to use easy-to-configure and easy-to-guess passwords. Since many people have multiple online accounts that require a username+password pair, people tend to use passwords that lack complexity so they are easy to remember and easy to enter. Bad actors are aware of this tendency and take advantage of it when performing an attack. Many password spray attacks employ a set of commonly used easy-to-guess passwords. Most of not all of these common passwords don't pass the acceptance points threshold set by the AAD Password Protection points-based algorithm.

Password spray and other password-centric attacks are identified when there is an increase in failed sign-in attempts. This increase indicates that a bad actor is attempting to guess a user's password and the failed attempts means the bad actors hasn't been able to guess passwords. Failed attempts can sometimes mean the genuine user has forgotten their own password and they are trying to guess it, but these failed sign-ins are normally evident only as a few attempts at a time.

In some networks 130, the presence of hundreds to thousands of failed attempts are indicators of an attack 214. More generally, an increase measure 306 may be absolute, e.g., based at least in part on noting 732 one hundred more failed attempts 310 than yesterday in a given network 130, or noting 732 a thousand more failed attempts 310 than in last week's average. Or an increase measure 306 may be relative, e.g., based at least in part on noting 732 at least 25% more failed attempts 310 than yesterday, or noting an increase of at least 15% in failed attempts 310 over a period of sixty minutes. These specific numbers are examples; a given embodiment may use other values for absolute increase thresholds, relative increase thresholds, and durations over which an increase is measured.

In some environments, before a bad actor's IP address is blocked due to IP blocking or before a user's account is locked, the bad actor must hit a threshold 420 or 426. Under one Microsoft AAD approach, for example, IP blocking depends on a pre-set threshold 420 defined by Microsoft, which is typically in the range of one hundred to thousands of failed attempts, and account lockout depends on a threshold 426 set by a cloud tenant's administrator, with a default threshold 426 of ten failed attempts. Similar thresholds 420 and 426 are used by some Microsoft Account (MSA) security enforcement mechanisms. Thus, the location blocking threshold 420 may allow thousands of failed sign-in attempts before the bad actor's IP is blocked from all authentication requests.

Some bad actors have picked up on the threshold patterns and have adjusted their attacking strategy and frequency of attacks to deliberately stay below the threshold(s) 420 or 426 or both. This is sometimes called a "low and slow" attack. Some bad actors 218 change their IP addresses so that IP blocking mechanisms never flag them. This allows the bad actors to continuously perform attacks without ever getting blocked.

Recognizing that bad actors use common passwords in their attacks and that these common passwords can be filtered out by the AAD Password Protection points-based algorithm or other strength testing code 434, some embodiments employ the passwords used in these attacks (or the characteristics of such passwords such as shortness and simplicity) to identify attackers faster and to proactively block them before they hit the more granular thresholds 420, 426.

In some embodiments, existing cybersecurity mechanisms for IP blocking and account lockout logic are enhanced to help block bad actors sooner, before they even hit less focused thresholds 420, 426. Those broader thresholds were defined by a software vendor, a cloud service provider, or an enterprise, for example. More finely tuned restriction thresholds 422, 428 may be defined by the same entities, but operate differently as discussed herein.

In some embodiments, whenever a failed sign-in is detected, the enhanced cybersecurity mechanism will flag whether the failed password was a weak password or known bad password. Weak passwords will be classified as such by using AAD Password Protection's points-based algorithm or other password strength testing code 434. If the failed password has the points needed to pass the AAD Password Protection threshold or other applicable acceptance threshold, the password will be considered a strong password. Otherwise, the password will be deemed a known bad password (and hence be deemed a weak passphrase 410). A counter 506 for the number of failed sign-ins with known bad passwords will be kept for each account, and a counter 510 for the number of failed sign-ins with known bad passwords will be kept for each IP address.

If such an embodiment notes a high volume of failed sign-ins coming from an IP address and a majority of those failed sign-ins are using weak passwords, the IP will be blocked 418 immediately. This blocking will be done before the IP address hits the overall IP blocking threshold 420. Similarly, if the embodiment notes a high volume of failed sign-in attempts towards an account and a majority of those failed sign-ins are using weak passwords, the account will be locked 424 immediately, before the account hits the defined Smart Lockout threshold or similar lockout threshold 426.

In this example, this data 506, 510 will be obtained for any non-repeated bad password request that comes in from unfamiliar locations 440, as opposed to requests from a familiar location 438 such as a familiar IP address or device or browser used previously by the account's owner. This distinction between unfamiliar and familiar locations may be made because identity attacks are often performed from outside of the user's location and using devices that are not owned by the account's genuine user. Making a location familiarity distinction avoids inconveniencing users on the basis of genuine user traffic, which normally comes from the account's familiar locations, devices, and IP addresses.

Such improvements may block bad actors before large thresholds 420, 426 for wide scale attacks are met. Bad actors that change their IP address to dodge IP blocking may now be caught because detection won't focus only on the actual IP address, but will also consider the passwords attackers are spraying during the attack.

Additional support for the discussion above is provided below. For convenience, this additional support material appears under various headings. Nonetheless, it is all intended to be understood as an integrated and integral part of the present disclosure's discussion of the contemplated embodiments.

Technical Character

The technical character of embodiments described herein will be apparent to one of ordinary skill in the art, and will also be apparent in several ways to a wide range of attentive readers. Some embodiments address technical activities such as password spray attack detection, automatically counting failed sign-in attempts in a cloud, differentiating between strong and weak passwords using points-based or other testing code 434 that checks hundreds of variations in real time, maintaining failed login counters for hundreds or even thousands of user accounts 316, and maintaining failed login counters for thousands or even tens of thousands of IP addresses 436, which are each activities deeply rooted in computing technology. Some of the technical mechanisms discussed include, e.g., password strength testing code 434, logs 206 that track weak credentials 308 and failed sign-ins 310, digital access restriction conditions 312 and access restrictions 314, restriction thresholds 422, 428, and compromised password lists 430 with thousands or more entries. Some of the technical effects discussed include, e.g., faster identity attack detection based on WCFSI measures 306 than is provided when detection does not consider credential strength, and attack 214 detection despite an attacker's use of rotating IP addresses 436. Thus, purely mental processes are clearly excluded. Other advantages based on the technical characteristics of the teachings will also be apparent to one of skill from the description provided.

Some embodiments described herein may be viewed by some people in a broader context. For instance, concepts such as authentication, failure, identity, security, and strength may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to automatically and effectively assess the likelihood that certain accounts and IP addresses are part of a cyberattack. Other configured storage media, systems, and processes involving authentication, failure, identity, security, or strength are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples, password strength testing algorithms, operating system environments, feature examples, software processes, development tools, identifiers, data structures, data organizations, notations, control flows, pseudocode, naming conventions, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
CSV: comma-separated values
DVD: digital versatile disk or digital video disc
FPGA: field-programmable gate array
FPU: floating point processing unit
GPU: graphical processing unit
GUI: graphical user interface
HIDS: host intrusion detection system
IaaS or IAAS: infrastructure-as-a-service
ID: identification or identity
IoT: Internet of Things
IP: internet protocol
LAN: local area network
NIDS: network intrusion detection system
OS: operating system
PaaS or PAAS: platform-as-a-service
RAM: random access memory
ROM: read only memory
SIEM: security information and event management; also refers to tools which provide security information and event management
TCP: transmission control protocol
TPU: tensor processing unit
UDP: user datagram protocol
UEFI: Unified Extensible Firmware Interface
URI: uniform resource identifier
URL: uniform resource locator
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

An "administrator" is any user that has legitimate access (directly or indirectly) to multiple accounts of other users by using their own account's credentials. Some examples of administrators include network administrators, system administrators, domain administrators, privileged users, service provider personnel, and infrastructure administrators.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing or data generation or actuator nodes. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

"Access" to a computational resource includes use of a permission or other capability to read, modify, write, execute, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Identity attack detection operations such as parsing logs 206 to extract sign-in attempt results for multiple accounts of multiple users 104, testing 702 passphrase strength, identifying locations 318 and categorizing locations as to familiarity, updating 604 measures 306 in a cloud or other network 130 having dozens or more users 104, triggering 612 defensive code, locking 616 accounts 316, blocking 618 IP addresses 436, and many other operations discussed herein, are understood to be inherently digital. A human mind cannot interface directly with a CPU or other processor, or with RAM or other digital storage, to read and write the necessary data to perform the identity attack detection 624 or defense 626 steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as ascertaining, authenticating, blocking, counting, defending, detecting, determining, executing, finding, harvesting, imposing, initiating, locking, logging, measuring, monitoring, noting, reaching, reporting, residing, requiring, restricting, searching, tracking, triggering, updating (and ascertains, ascertained, authenticates, authenticated, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as a "computational system" or "computing system", and when in a network may be referred to as a "node"
104 users, e.g., user of a monitored system 130
106 peripherals
108 network generally, including, e.g., LANs, WANs, software-defined networks, clouds, and other wired or wireless networks
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, UEFI, device drivers
122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, and so on
124 applications, e.g., word processors, web browsers, spreadsheets, games, email tools, commands
126 display screens, also referred to as "displays"
128 computing hardware not otherwise associated with a reference number 106, 108, 110, 112, 114
130 monitored computer network, e.g., a system 102 whose resources or activity or both are logged, traced, analyzed, or otherwise monitored to provide or optimize cybersecurity; monitored networks 130 may include clouds, local area networks (LANs), client-server networks, software-defined networks, or networks which have at least one trust domain enforced by a domain controller, for example; these network categories may overlap, e.g., a LAN may have a domain controller and also operate as a client-server network; teachings herein may also be applied to detect identity attacks in networks which do not happen to match any of the examples listed here
202 monitored computers, e.g., computers 102 (nodes 102) in a monitored computer network 130
204 communications between computers; may also be referred to as "traffic" or "packets", for example
206 logs, namely automatically created records of certain events in a computing system; may be in a syslog format, or another format; logs may include traffic logs from firewalls, security logs from workstations, security logs from servers, and logs provided to or generated by security information and event management (SIEM) tools; SIEMs may consolidate logs that were generated by one or more of a firewall, workstation, server, router, NIDS, HIDS, or other devices and tools; logs may overlap, e.g., the same events may appear in different logs; logs may also be obtained from sources that are not listed among these examples 208 event; may also be referred to as an "entry" or set of entries in a log or as data 208

210 identity attack detection system; may be a distinct component of a network, or be part of a SIEM, an intrusion detection system, an intrusion prevention system, or another aspect of cybersecurity infrastructure, for instance 212 identity attack detection functionality, e.g., software 304 or data structures used by or generated by software 304

214 identity attack; typically performed by an external or insider attacker who is acting beyond the scope of the authority (if any) granted to them by the owner of a monitored network, but may also be part of a penetration test or quality control test, for example 218 attacker, e.g., a person or automation who is acting within a network beyond the scope of the authority (if any) granted to them by the owner of the network; may be external or an insider; may also be referred to as an "adversary"

220 network boundary, e.g., as defined by routers or gateways or IP address assignments; may also be referred to as network "perimeter"

222 cybersecurity center; may also be referred to as a "security operations center" or SOC; may be formally designated in an organizational chart, or may be implicit in the assigned duties of personnel, or both 302 interface to a system 210; may include, e.g., shells, graphical or other user interfaces, network addresses, APIs, network interface cards, ports 304 identity attack detection software; may implement any of the methods 600 or 700, or any of the functionality 212, for example 306 weak credential usage in failed sign-ins measure; also referred to as a "WCFSI measure"

308 weak credential; as used herein a "weak" credential means a credential that is compromised or structurally weak or both; structurally weak means, e.g., too short or too simple to be accepted for use in a particular environment 310 failed sign-in; may also be referred to as a "failed login", "failed sign-in attempt", or "failed login attempt", for example 312 access restriction condition, e.g., an absolute or relative threshold for a count or other measure 306 of failed sign-ins that use one or more weak credentials; a time period may be implicit or explicit in an access restriction condition, e.g., percentage of failed sign-ins with weak passwords within the past 24 hours; a condition 312 may involve multiple measures 306

314 access restriction, e.g., locking an account or blocking an IP address or requiring additional authentication 316 target account; may also be referred to simply as an "account"; refers to any digital resource that requires user authentication as a precondition of access 318 source location; may also be referred to as a "traffic source" or simply as a "location"; refers to any source of a request for access to an account; may be, e.g., an IP address, URL, device, device fingerprint, browser fingerprint, API, or a set of such items such as a block (group) of IP addresses 320 attack candidate, e.g., possible or likely identity attack, such as a set of suspect login attempts 400 aspect of identity attack detection system or method 402 sign-in; may also be referred to as a "login" or "sign-in" or "sign-on"; may refer to the act of logging in (a.k.a., "logging on"), or to a memorialization of that act in a log which includes data about one or more logins, e.g., when they occurred, which username was used, which credential was used, which computer was logged into 404 username generally 406 wrong username for an account of interest; a username that is not recognized as part of proper authentication in the context of a particular target account 408 passphrase generally; a sequence of characters or other digital values submitted as authentication in the context of a particular target account; a passphrase is a generalization of passwords; a "passphrase" may include one or more passwords and may allow spaces or other characters between them, including characters not permitted in passwords 410 weak passphrase, e.g., one that has been compromised, or one that lacks the length or complexity required for use in a network 130 of interest 412 passphrase length, e.g., number of characters in a passphrase 414 passphrase complexity, e.g., diversity of characters in a passphrase, lack of repetition in a passphrase, or both 416 repetition in a passphrase; also referred to as "repeats" in a passphrase 418 block an IP address or other location to prevent processing of further communications from it until it is unblocked; some mechanisms block an IP address in response to the number if unsolicited emails sent from the IP address or in response to finding the IP address on a published list of bad (malicious) IP addresses, but blocking may also be based at least in part on whether weak credentials were sent from the IP address in failed sign-ins 420 blocking threshold; the number of failed sign-ins at which a mechanism will block an IP address without distinguishing between failed sign-ins on the basis of credential strength 422 location restricting threshold; the number of failed sign-ins using weak credentials at which a mechanism will block an IP address or other source location; it is expected but not necessarily required that the location restriction threshold 422 will be lower than the location blocking threshold 420

424 lock an account to prevent processing of further communications to it, or access to it, or both, until it is unlocked; sometimes referred to as account "lockout"

426 account locking threshold; the number of failed sign-ins at which a mechanism will lock an account without distinguishing between failed sign-ins on the basis of credential strength 428 account restriction threshold; the number of failed sign-ins using weak credentials at which a mechanism will lock an account; it is expected but not necessarily required that the account restriction threshold 428 will be lower than the account locking threshold 426

430 compromised passphrase list, e.g., a table, tree, database, text list, CSV lists, linked list, hash table list, combination thereof, or other data structure containing compromised passphrases, e.g., passphrases known to more than their respective original authorized users; item 430 is referred to as a "list" merely for convenience, not in order to limit the range of data structures that contain the compromised passphrases; a list of passphrases may be specific to a particular target account or it may be a list of weak passphrases deemed at higher risk for compromise, or both for example 432 set of target accounts; may also be referred to as a "list", "group", or "collection" of accounts, for example 434 passphrase strength testing code, e.g., code which tests passphrase length or complexity or both against criteria defined for passwords acceptable for use in a given network 130

436 IP address, e.g., an IPv4 address or an IPv6 address 438 familiar location, e.g., a location 318 previously associated with a particular user is familiar with respect to login attempts to an account of that user 440 unfamiliar location e.g., a location 318 not previously associated with a particular user is unfamiliar with respect to login attempts to an account of that user 442 set of source locations; may also be referred to as a "list", "group", or "collection" of locations, for example 502 credential, e.g., one or more passphrases (which include passwords as a subset), usernames, digital certificates or tokens used for authentication, and any other data or procedure or item used for authentication in a computing system 102

504 measure of weak credential failed sign-ins toward an account; may be a numeric value such as a raw count, or a statistical measure such as an average or sampling result 506 numeric count of weak credential failed sign-ins toward an account 508 measure of weak credential failed sign-ins from a location; may be a numeric value such as a raw count, or a statistical measure such as an average or sampling result 510 numeric count of weak credential failed sign-ins from a location 512 measure of weak credential failed sign-ins from a familiar location 438; may be a numeric value such as a raw count, or a statistical measure such as an average or sampling result 514 numeric count of weak credential failed sign-ins from a familiar location 438

516 measure of weak credential failed sign-ins from an unfamiliar location 440; may be a numeric value such as a raw count, or a statistical measure such as an average or sampling result 518 numeric count of weak credential failed sign-ins from an unfamiliar location 440

520 measure of weak credential failed sign-ins toward any of a set of multiple accounts; may be a numeric value such as a raw count, or a statistical measure such as an average or sampling result 522 numeric count of weak credential failed sign-ins toward any of a set of multiple accounts 524 measure of weak credential failed sign-ins from any of a set of multiple locations; may be a numeric value such as a raw count, or a statistical measure such as an average or sampling result 526 numeric count of weak credential failed sign-ins from any of a set of multiple locations 600 flowchart; 600 also refers to identity attack detection methods illustrated by or consistent with the FIG. 6 flowchart 602 determine that a weak credential was used in a failed sign-in, e.g., by parsing logs 206 or network communications 204 or events 208 collected in a SIEM in order to identify login attempts, identify their success or failure, and identify the credential used and by then testing the credential's strength 604 update one or more measures of weak credential failed sign-ins, e.g., by incrementing one or more counters or by calculating one or more averages or other statistical results 606 ascertain whether an access restriction condition is satisfied, e.g., by computationally comparing an updated measure 306 to a threshold specified in an access restriction condition 608 initiate an access restriction, e.g., by performing step 610 or 612

610 report an attack candidate, e.g., by providing content (e.g., condition 312 met, timestamp) in a text message, email, generated-voice message, printout, alert, screen display, or other communication to an administrator or to security personnel or both 612 trigger defense code, e.g., by making a remote procedure call, or by sending a message, signal, or other digital action or communication to a tool such as an intrusion prevention system, firewall, or exfiltration prevention tool in order to request (as a possible action or as a command) that the triggered tool impose an access restriction 614 impose an access restriction, e.g., by performing step 616, 618, or 620

616 lock an account 618 block a location, e.g., an IP address or device or geolocation 620 require additional authentication beyond a username and passphrase before permitting access to a target account or accepting further communication from a source location 622 additional authentication beyond a username and passphrase, e.g., a one time password (OTP) sent by text message or email or generated by an authenticator app, or a biometric credential such as a fingerprint scan result, voiceprint, face recognition, or iris scan result, or a verified presence of a hardware token, or a digital token or certificate 624 detect an identify attack, e.g., by performing steps 602, 604, and 606

626 defend against an identify attack, e.g., by performing step 608 or 614

700 flowchart; 700 also refers to identity attack detection methods illustrated by or consistent with the FIG. 7 flowchart (which incorporates the steps of FIG. 6)

702 execute passphrase strength testing code, e.g., by calling an API or routine 704 search a list of compromised passwords, e.g., by executing search code that implements a binary search, linear search, or other search algorithm 706 impose a restriction 314 at a lower threshold 428 than the lockout threshold 426 used in some less focused mechanisms; step 706 is an example of step 614

708 reach a lockout threshold 426 which does not depend on credential weakness assessment 710 initiate or impose a restriction 314 on insider access 712 reside inside a monitored network 130, e.g., together with monitored computers 202 behind a firewall or gateway separating the monitored network 130 from the internet or from another network 108 of an entity 714 reside outside a monitored network 130, e.g., apart from monitored computers 202 on the other side of a firewall or gateway 716 impose a restriction 314 at a lower threshold 422 than the blocking threshold 420 used in some less focused mechanisms; step 716 is an example of step 614

718 reach a blocking threshold 420 which does not depend on credential weakness assessment 720 harvest a passphrase from an attempt (failed only in some embodiments, failed or succeeded in others) to sign-in to a monitored computer 202, e.g., by parsing a log 206

722 harvest a passphrase from an attempt (failed only in some embodiments, failed or succeeded in others) to sign-in to a computer other than a monitored computer 202, e.g., by parsing a log 206 or importing from a list 430 in which targeted computers are not individually identified 724 determine that a failed sign-in used a wrong username, e.g., by parsing a log or event 208 stream; step 724 is an example of step 602 in which the weak credential is (or in which weak credentials include) a wrong username 726 use a credential in a sign-in attempt, e.g., by entering (or supplying for entry) a passphrase or a username or both 728 find repetition in a passphrase, e.g., by parsing the passphrase using regular expressions, rotation, duplicate substring searching, or other techniques 730 reach an access restriction threshold 422 or 428 in a counter value or other measure 306 value, e.g., an average or a sampling 732 note that a sign-in attempt failed, e.g., by parsing a log or event stream for a result of the sign-in attempt 734 determine credential weakness, e.g., by testing 702 credential strength or searching 704 a list of compromised (and therefore weak) credentials 736 any step discussed in the present disclosure that has not been assigned some other reference numeral

CONCLUSION

In short, the teachings herein provide a variety of identity attack detection and defense functionalities which operate in enhanced systems 210. Cybersecurity is enhanced, with particular attention to automated attacks which result in failed sign-ins using weak credentials. Some embodiments detect 624 identity attacks 214 by comparing usage 726 of compromised passphrases 430 and variations thereof or other weak credentials 308 in failed sign-in attempts 310 to access restriction conditions 312. A restriction threshold (422 or 428 or both) amount 306 of weak credential failed sign-ins (WCFSI) or a WCFSI measure 306 increase indicates 606 an identity attack 214, such as a password spray attack 214. Going beyond noting 732 merely the number of failed sign-ins 310 by also considering (e.g., 734 or 702) credential strength (the alternative to weakness 308) allows embodiments to detect 624 attacks 214 sooner than other approaches.

An embodiment may also initiate 608 or impose 614 defenses, e.g., by locking 616 accounts 316, by blocking 618 IP addresses 436, or by requiring 620 additional authentication 622 before access to an account is allowed. Weak credentials 308 may include short passwords (e.g., length 412 under ten characters), simple passwords (e.g., lacking complexity 414 in the form of diverse character groups), compromised passwords 430, or wrong usernames 406, for instance. Password strength testing 702 may be used for attack 214 detection 624 in addition to the preventive hygiene use on passwords that are proposed by authorized users 104 when accounts 316 are created. Familiar locations 438 and unfamiliar locations 440 which are sources 318 of traffic 204 may be tracked (e.g., measured 306), as sets 442 or individually. Other aspects of embodiments are also described herein.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware into SIEM software. Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 6 and 7 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of runtimes or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. An attack detection system which is configured for automatic detection of an identity attack and for initiating an automatic defense against the identity attack, the system comprising:
    a digital memory;
    a processor in operable communication with the memory, the processor configured to perform steps for detecting an identity attack in or against a monitored network, the steps including (a) determining that a credential used in a failed sign-in to a target account from a source location is a weak credential, (b) in response to the determining, updating a measure of weak credential failed sign-ins, (c) ascertaining that the updated measure satisfies an access restriction condition, and (d) in response to at least the ascertaining, initiating an access restriction on at least one of the target account and the source location, whereby the system enhances cybersecurity by detecting behavior which indicates an identity attack and by initiating an access restriction in response to the behavior, and wherein said detecting is based on at least both noting sign-in failure and determining credential weakness.

2. The system of claim 1, wherein the measure of weak credential failed sign-ins comprises at least one of the following:
    a measure based on a count of weak passphrase failed sign-ins directed to the target account;
    a measure based on a count of weak passphrase failed sign-ins directed from the source location;
    a measure based on a count of weak passphrase failed sign-ins directed from the source location when the source location is familiar in that the source location has been previously associated with an authorized user of the target account;
    a measure based on a count of weak passphrase failed sign-ins directed from the source location when the source location is unfamiliar in that the source location has not been previously associated with an authorized user of the target account;

a measure based on a count of weak passphrase failed sign-ins directed to any of a predefined set of accounts that includes the target account; or a measure based on a count of weak passphrase failed sign-ins directed from any of a predefined set of locations that includes the source location;

a measure based on a count of wrong username failed sign-ins directed to the target account;

a measure based on a count of wrong username failed sign-ins directed from the source location;

a measure based on a count of wrong username failed sign-ins directed from the source location when the source location is familiar in that the source location has been previously associated with an authorized user of the target account;

a measure based on a count of wrong username failed sign-ins directed from the source location when the source location is unfamiliar in that the source location has not been previously associated with an authorized user of the target account;

a measure based on a count of wrong username failed sign-ins directed to any of a predefined set of accounts that includes the target account;

a measure based on a count of wrong username failed sign-ins directed from any of a predefined set of locations that includes the source location; or a measure of an increase in weak credential failed sign-ins.

3. The system of claim 1, comprising a passphrase strength testing code which upon execution tests passphrase strength and which is configured to test proposed passphrases submitted by authorized users of accounts in the monitored network, and wherein determining that a passphrase used in a failed sign-in to a target account from a source location is a weak passphrase includes executing the passphrase strength testing code.

4. The system of claim 1, comprising a list of compromised passphrases, and wherein determining that a passphrase used in a failed sign-in to a target account from a source location is a weak passphrase includes searching the list of compromised passphrases.

5. The system of claim 1, wherein the attack detection system resides in the monitored network.

6. An attack detection method for enhancing cybersecurity, comprising:
    determining that a passphrase used in a failed sign-in to a target account from a source location is a weak credential;
    in response to the determining, updating a measure of weak credential failed sign-ins;
    ascertaining that the updated measure satisfies an access restriction condition;
    in response to at least the ascertaining, imposing an access restriction on at least one of the target account and the source location;
    whereby the method enhances cybersecurity by detecting behavior which indicates an identity attack and by imposing an access restriction in response to the behavior, and wherein said detecting is based on at least both noting sign-in failure and determining credential weakness.

7. The method of claim 6, wherein the method imposes an access restriction on access to the target account before an account lockout threshold number of failed sign-ins has been directed to the target account.

8. The method of claim 6, wherein the method imposes an access restriction on access from the source location before a source location blocking threshold number of failed sign-ins has been directed from the source location.

9. The method of claim 6, wherein the credential includes a passphrase and determining that the credential is a weak credential comprises at least one of the following:
    testing strength of the passphrase based on at least passphrase length;
    testing strength of the passphrase based on at least passphrase complexity; or
    searching a list of compromised passphrases.

10. The method of claim 6, wherein imposing the access restriction comprises at least one of the following:
    locking the target account;
    requiring an additional authentication for access to the target account; or
    blocking an IP address at the source location.

11. The method of claim 6, wherein ascertaining that the updated measure satisfies an access restriction condition comprises ascertaining that a majority of the failed sign-ins coming from the source location used one or more weak passphrases.

12. The method of claim 6, wherein ascertaining that the updated measure satisfies an access restriction condition comprises ascertaining that a majority of the failed sign-ins towards the target account used one or more weak passphrases.

13. The method of claim 6, wherein determining that the credential is a weak credential comprises at least one of the following:
    searching a list of compromised passphrases which includes passphrases harvested from attempts to sign-in to the monitored network; or
    searching a list of compromised passphrases which includes passphrases harvested from attempts to sign-in to one or more networks other than the monitored network or from attempts to sign-in to an unspecified network.

14. The method of claim 6, wherein imposing an access restriction comprises restricting access attempts that come from inside the monitored network.

15. The method of claim 6, wherein updating a measure of weak passphrase failed sign-ins comprises:
    updating a familiar location attempt count of weak passphrase failed sign-ins to the target account which came from one or more familiar locations; and
    updating an unfamiliar location attempt count of weak passphrase failed sign-ins to the target account which came from one or more unfamiliar locations;
    wherein a location is familiar when the location has been previously associated with an authorized user of the target account, and otherwise the location is unfamiliar.

16. A computer-readable storage medium configured with data and instructions which upon execution by a processor cause a computing system to perform an attack detection method for enhancing cloud cybersecurity, the method comprising:
    determining that a credential used in a failed sign-in to a target account in a cloud computing environment from a source location is a weak credential;
    in response to the determining, updating a measure of weak credential failed sign-ins;
    ascertaining that the updated measure satisfies an access restriction condition; and
    in response to at least the ascertaining, initiating an access restriction on at least one of the target account and the source location;

whereby the system enhances cybersecurity by detecting behavior which indicates an identity attack and by initiating an access restriction in response to the behavior, and wherein said detecting is based on at least both noting sign-in failure and determining credential weakness.

17. The computer-readable storage medium of claim 16, wherein the credential includes a username and the method comprises:

determining that the username used in a failed sign-in to a target account in a cloud computing environment from a source location is a wrong username;

in response to the determining, updating a measure of wrong username failed sign-ins; and wherein initiating the access restriction is at least partially in response to the measure of wrong username failed sign-ins.

18. The computer-readable storage medium of claim 16, wherein the credential includes a passphrase and determining that the credential is a weak credential comprises finding at least one of the following in the passphrase: repetition of a character, or repetition of a string.

19. The computer-readable storage medium of claim 16, wherein updating the measure comprises:

updating account counters which track the number of failed sign-ins with weak passphrases for each of a plurality of respective accounts; and updating IP address counters which track the number of failed sign-ins with weak passphrases for each of a plurality of IP addresses.

20. The computer-readable storage medium of claim 16, wherein ascertaining that the updated measure satisfies an access restriction condition comprises at least one of the following:

ascertaining that a count of failed sign-ins directed to the target account has reached an account restriction threshold, when the account restriction threshold is no greater than seventy percent of an account lockout threshold that is not based on any passphrase weakness determination; or ascertaining that a count of failed sign-ins directed from the source location has reached a source location restriction threshold, when the source location restriction threshold is no greater than sixty percent of a source location blocking threshold that is not based on any passphrase weakness determination.

* * * * *